United States Patent Office 2,848,596
Patented Aug. 19, 1958

2,848,596

WELDING-ROD

Harald Strohmeier and Wilfried Mader, Kapfenberg, Steiermark, Austria, assignors to Gebr. Bohler & Co. Aktiengesellschaft, Vienna, Austria No Drawing. Application July 22, 1955
Serial No. 523,931

Claims priority, application Austria August 2, 1954

1 Claim. (Cl. 219—146)

In order to get welded, powdered material or granular material, such as sintered or cast hard-metal usually is introduced into tubes of iron or steel. The charging material can be either stamped in or sintered in or introduced by similar way. Nickel as well as copper already has been suggested for tube-material.

In the processes for making welding-rods, as we know them at present, the nickel or copper-tube serves two purposes: it forms a support for the crushed hard-material as well as a bedding-material for the molten material filled in. A ferrous alloy, containing aluminium also had been suggested already.

However, welding-rods, the surrounding tubular coating of which consisted of metallic material, as usually applied for that purpose, turned out inadequate during further working, so that the desired quality of the weld could not be achieved. This lack evidently seems caused by the tube-material.

In many cases, however, it is required to avoid any contact of iron, nickel and copper—i. e. the very metals usually applied for making those tubes—with the welded material.

Therefore this invention suggests to make tubes, into which the dispersed material such as hard-metal, is introduced for getting welded, as thin as possible, so that the tube-material gets burned completely during the welding process and thus cannot penetrate into the weld.

Aluminium has proven especially satisfactory for this purpose. But other metals, such as zinc, cadmium or similar can be used as well.

The reason, why aluminium-tubes have proven so successful, especially for arc-welding, is the high affinity of aluminium towards oxygen, which caused violent absorption of oxygen during welding; so a considerable degree of desoxydation is achieved by the burning tube.

Especially hard-metal-carbides being extremely sensitive towards oxydation, small amounts of oxygen already are able to affect the quality of the weld.

Therefore it certainly means a great advantage, if the tube can be used both as a support and as a desoxydizing agent. The tube-material practically getting burned completely, the composition of the weld is not at all changed by the socket.

In addition to this, coating of fluxes may be applied to welding rods in arc-welding-processes; especially lime-basic coating material has proven successful.

We claim:

Welding rod consisting of a metal tube containing hard substances selected from the group consisting of hard metal and hard metal carbides in comminuted form, the tube being formed of a metal selected from the group consisting of aluminum, zinc and cadmium, and which is of a thickness to be completely burned up during welding by oxidation and combustion.

References Cited in the file of this patent

UNITED STATES PATENTS

| | | |
|---|---|---|
| 1,650,905 | Mills | Nov. 29, 1927 |
| 1,757,601 | Stoody et al. | May 6, 1930 |
| 1,825,829 | Stoody et al. | Oct. 6, 1931 |
| 2,023,364 | Crapo | Dec. 3, 1935 |
| 2,137,471 | Zublin | Nov. 22, 1938 |
| 2,319,977 | Cape et al. | May 25, 1943 |
| 2,442,087 | Kennedy | May 25, 1948 |

FOREIGN PATENTS

| | | |
|---|---|---|
| 513,045 | Great Britain | Dec. 20, 1937 |